United States Patent
Kush et al.

(10) Patent No.: US 11,692,446 B2
(45) Date of Patent: Jul. 4, 2023

(54) AIRFOIL WITH SINTERED POWDER COMPONENTS

(71) Applicants: Rolls-Royce North American Technologies, Inc., Indianapolis, IN (US); Rolls-Royce Corporation, Indianapolis, IN (US)

(72) Inventors: Matthew T. Kush, Indianapolis, IN (US); Michael Wood, Indianapolis, IN (US); Scott Nelson, Indianapolis, IN (US); Joseph Peter Henderkott, Indianapolis, IN (US)

(73) Assignees: Rolls-Royce North American Technologies, Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 0 days.

(21) Appl. No.: 17/448,661

(22) Filed: Sep. 23, 2021

(65) Prior Publication Data
US 2023/0093658 A1   Mar. 23, 2023

(51) Int. Cl.
*B22F 5/04* (2006.01)
*F01D 5/18* (2006.01)
(Continued)

(52) U.S. Cl.
CPC ............ *F01D 5/187* (2013.01); *B22F 5/00* (2013.01); *B22F 5/04* (2013.01); *B22F 7/00* (2013.01); *B22F 10/22* (2021.01); *B23K 1/0018* (2013.01); *B33Y 80/00* (2014.12); *B23K 2101/001* (2018.08); *F05D 2230/22* (2013.01);
(Continued)

(58) Field of Classification Search
CPC .... F01D 5/187; B22F 5/00; B22F 5/04; B22F 7/00; B22F 10/22; B23K 1/0018; B23K 2101/001; B33Y 80/00; F05D 2230/22; F05D 2230/237; F05D 2230/31; Y10T 29/49337
See application file for complete search history.

(56) References Cited

U.S. PATENT DOCUMENTS 3,067,508 A   12/1962   Kinelski
3,390,986 A   7/1968   Stenerson
(Continued)

FOREIGN PATENT DOCUMENTS

DE   102005059299 A1   6/2006
DE   102014226055 A1   6/2016
(Continued)

OTHER PUBLICATIONS

U.S. Appl. No. 17/659,397, filed Apr. 15, 2022, naming inventors Xu et al.

*Primary Examiner* — Ryan J. Walters
(74) *Attorney, Agent, or Firm* — Shumaker & Sieffert, P.A.

(57) ABSTRACT

A method for forming a component for a gas turbine engine may include forming a first portion of the component that includes a cast metal or metal alloy, forming a second portion of the component that includes presintered preform defining at least one support structure, positioning the second portion on the first portion to define an assembly such that the first portion and the second portion define at least one cooling channel therebetween, and heating the assembly to join the first portion and the second portion and form the component.

15 Claims, 4 Drawing Sheets

(51) Int. Cl.
*B23K 1/00* (2006.01)
*B22F 10/22* (2021.01)
*B33Y 80/00* (2015.01)
*B22F 5/00* (2006.01)
*B22F 7/00* (2006.01)
*B23K 101/00* (2006.01)

(52) U.S. Cl.
CPC .... *F05D 2230/237* (2013.01); *F05D 2230/31* (2013.01); *Y10T 29/49337* (2015.01)

(56) References Cited

U.S. PATENT DOCUMENTS

| | | | |
|---|---|---|---|
| 4,125,344 A * | 11/1978 | Tiefenbacher | F01D 5/045 |
| | | | 416/214 A |
| 4,209,348 A | 6/1980 | Duhl et al. | |
| 4,325,994 A | 4/1982 | Kitashima et al. | |
| 4,396,445 A * | 8/1983 | Sasaki | B22F 7/062 |
| | | | 156/89.28 |
| 4,611,752 A | 9/1986 | Jahnke | |
| 4,614,296 A | 9/1986 | Lesgourgues | |
| 4,940,566 A | 7/1990 | Wood et al. | |
| 5,017,753 A | 5/1991 | Deckard | |
| 5,332,360 A | 7/1994 | Correia et al. | |
| 5,381,944 A | 1/1995 | Makowiecki et al. | |
| 5,395,584 A | 3/1995 | Berger et al. | |
| 5,474,227 A | 12/1995 | Krengel et al. | |
| 5,732,468 A | 3/1998 | Galley et al. | |
| 5,797,725 A | 8/1998 | Rhodes | |
| 5,902,421 A | 5/1999 | Christy | |
| 5,902,498 A | 5/1999 | Mistry et al. | |
| 6,003,754 A | 12/1999 | Rhodes | |
| 6,172,327 B1 | 1/2001 | Aleshin et al. | |
| 6,195,864 B1 | 3/2001 | Chesnes | |
| 6,199,746 B1 | 3/2001 | Dupree et al. | |
| 6,213,714 B1 | 4/2001 | Rhodes | |
| 6,214,248 B1 | 4/2001 | Browning | |
| 6,325,871 B1 | 12/2001 | Burke et al. | |
| 6,454,885 B1 | 9/2002 | Chesnes et al. | |
| 6,575,702 B2 | 6/2003 | Jackson et al. | |
| 6,579,061 B1 | 6/2003 | Heyward et al. | |
| 6,797,914 B2 | 9/2004 | Speranza et al. | |
| 6,837,417 B2 | 1/2005 | Srinivasan | |
| 6,951,112 B2 | 10/2005 | Czachor | |
| 7,051,435 B1 | 5/2006 | Subramanian et al. | |
| 7,080,971 B2 | 7/2006 | Wilson | |
| 7,146,725 B2 | 12/2006 | Kottilingam et al. | |
| 7,343,676 B2 | 3/2008 | Ng | |
| 7,484,928 B2 | 2/2009 | Amess et al. | |
| 7,506,793 B2 | 3/2009 | Sathian | |
| 7,653,994 B2 | 2/2010 | Dasilva et al. | |
| 7,731,809 B2 | 6/2010 | Hu | |
| 7,761,989 B2 | 7/2010 | Lutz et al. | |
| 7,845,549 B2 | 12/2010 | Budinger | |
| 7,966,707 B2 | 6/2011 | Szela et al. | |
| 7,975,902 B2 | 7/2011 | Wilden et al. | |
| 8,070,450 B1 | 12/2011 | Ryznic | |
| 8,087,565 B2 | 1/2012 | Kottilingam et al. | |
| 8,247,733 B2 | 8/2012 | Zhu | |
| 8,356,409 B2 | 1/2013 | Perret | |
| 8,449,249 B2 | 5/2013 | Suchezky | |
| 8,528,208 B2 | 9/2013 | Rebak | |
| 8,539,659 B2 | 9/2013 | Szela et al. | |
| 8,555,500 B2 | 10/2013 | Vossberg et al. | |
| 8,590,158 B2 | 11/2013 | Gallagher et al. | |
| 8,685,314 B2 | 4/2014 | Tuppen et al. | |
| 8,703,044 B2 | 4/2014 | Sathian et al. | |
| 8,739,404 B2 | 6/2014 | Bunker et al. | |
| 8,875,392 B2 | 11/2014 | Richter | |
| 9,003,657 B2 | 4/2015 | Bunker et al. | |
| 9,085,980 B2 | 7/2015 | Mittendorf et al. | |
| 9,174,312 B2 | 11/2015 | Baughman et al. | |
| 9,228,958 B2 | 1/2016 | Shirkhodaie et al. | |
| 9,434,017 B2 | 9/2016 | Salm et al. | |
| 9,476,306 B2 | 10/2016 | Bunker | |
| 9,624,786 B2 * | 4/2017 | Xu | B23K 35/325 |
| 9,751,147 B2 | 9/2017 | Rhodes et al. | |
| 9,810,069 B2 | 11/2017 | Dubs et al. | |
| 9,863,249 B2 | 1/2018 | Shinn et al. | |
| 10,076,811 B2 | 9/2018 | Ozbaysal | |
| 10,315,264 B2 | 6/2019 | Cui et al. | |
| 10,875,128 B2 | 12/2020 | Xu et al. | |
| 11,090,771 B2 | 8/2021 | Henderkott et al. | |
| 11,305,363 B2 | 4/2022 | Xu et al. | |
| 2002/0157737 A1 | 10/2002 | Chesnes et al. | |
| 2003/0026697 A1 | 2/2003 | Subramanian et al. | |
| 2003/0177640 A1 | 9/2003 | Marques et al. | |
| 2004/0086635 A1 | 5/2004 | Grossklaus, Jr. et al. | |
| 2005/0067061 A1 | 3/2005 | Huang et al. | |
| 2005/0217110 A1 | 10/2005 | Topal | |
| 2006/0124706 A1 | 6/2006 | Raybould et al. | |
| 2007/0044306 A1 | 3/2007 | Szela et al. | |
| 2007/0154338 A1 | 7/2007 | Sathian et al. | |
| 2007/0163684 A1 | 7/2007 | Hu | |
| 2007/0284410 A1 | 12/2007 | Budinger | |
| 2008/0011813 A1 | 1/2008 | Bucci et al. | |
| 2008/0087710 A1 * | 4/2008 | Glaeser | C04B 35/645 |
| | | | 228/121 |
| 2009/0026182 A1 | 1/2009 | Hu et al. | |
| 2009/0041611 A1 | 2/2009 | Sathian et al. | |
| 2009/0255116 A1 | 10/2009 | McMasters et al. | |
| 2010/0059573 A1 | 3/2010 | Kottilingam et al. | |
| 2010/0257733 A1 | 10/2010 | Guo et al. | |
| 2011/0185739 A1 | 8/2011 | Bronson et al. | |
| 2012/0231295 A1 | 9/2012 | Kottilingam et al. | |
| 2012/0308843 A1 | 12/2012 | Ott et al. | |
| 2013/0086785 A1 | 4/2013 | Cui et al. | |
| 2013/0136941 A1 | 5/2013 | Zheng et al. | |
| 2014/0154082 A1 | 6/2014 | Shinn et al. | |
| 2014/0302278 A1 | 10/2014 | Bunker | |
| 2014/0369741 A1 | 12/2014 | Cui et al. | |
| 2015/0090773 A1 | 4/2015 | Schick et al. | |
| 2015/0224607 A1 | 8/2015 | Bruck et al. | |
| 2015/0367456 A1 | 12/2015 | Ozbaysal et al. | |
| 2015/0375322 A1 | 12/2015 | Salm et al. | |
| 2016/0151829 A1 | 6/2016 | Propheter-Hinckley et al. | |
| 2016/0177749 A1 | 6/2016 | Brandl et al. | |
| 2016/0230576 A1 | 8/2016 | Freeman et al. | |
| 2016/0230993 A1 | 8/2016 | Dai et al. | |
| 2016/0250725 A1 | 9/2016 | Henderkott et al. | |
| 2016/0251965 A1 * | 9/2016 | Henderkott | F23R 3/002 |
| | | | 60/752 |
| 2016/0305249 A1 * | 10/2016 | Crosatti | F01D 5/34 |
| 2016/0339544 A1 | 11/2016 | Xu et al. | |
| 2016/0375461 A1 | 12/2016 | Taylor | |
| 2017/0122562 A1 * | 5/2017 | Berry | F23M 5/08 |
| 2017/0252870 A1 | 9/2017 | Cui et al. | |
| 2017/0306775 A1 * | 10/2017 | Hoskin | F01D 9/065 |
| 2018/0031226 A1 | 2/2018 | Burchill et al. | |
| 2018/0073390 A1 | 3/2018 | Varney | |
| 2018/0073396 A1 | 3/2018 | Varney | |
| 2018/0093354 A1 | 4/2018 | Cui et al. | |
| 2018/0313226 A1 | 11/2018 | Henderson et al. | |
| 2020/0064809 A1 * | 2/2020 | Sanders | G06F 30/17 |
| 2020/0139493 A1 | 5/2020 | Henderkott et al. | |
| 2020/0254548 A1 | 8/2020 | Xu et al. | |
| 2022/0097184 A1 | 3/2022 | Henderkott et al. | |
| 2022/0241881 A1 | 8/2022 | Xu et al. | |

FOREIGN PATENT DOCUMENTS

| | | |
|---|---|---|
| EP | 1803521 A1 | 7/2007 |
| EP | 1880793 A2 | 1/2008 |
| EP | 1884306 A1 | 2/2008 |
| EP | 2078579 A1 | 7/2009 |
| EP | 2206575 A1 | 7/2010 |
| EP | 2578720 A2 | 4/2013 |
| EP | 2713007 A1 | 4/2014 |
| EP | 3095550 A1 | 11/2016 |
| WO | 98/45491 A1 | 10/1998 |
| WO | 2012092279 A1 | 7/2012 |

(56) References Cited

FOREIGN PATENT DOCUMENTS

| WO | 2014/143963 A1 | 9/2014 |
| WO | 2016096382 A1 | 6/2016 |

\* cited by examiner

US 11,692,446 B2

AIRFOIL WITH SINTERED POWDER COMPONENTS

This invention was made with government support under Contract No. FA8650-19-D-2063 awarded by the United States Air Force/Air Force Materiel Command (Department of Defense). The government has certain rights in this invention.

TECHNICAL FIELD

The present disclosure relates to airfoils that include sintered powder components, such as portions of an airfoil that includes cooling channels.

BACKGROUND

Hot section components of a gas turbine engine may be operated in high temperature environments that may approach or exceed the softening or melting points of the materials of the components. Such components may include air foils including, for example turbine blades or foils which may have one or more surfaces exposed to high temperature combustion or exhaust gases flowing across the surface of the component. Different techniques have been developed to assist with cooling of such components including for example, application of a thermal barrier coating to the component, constructing the component as a single or dual-walled structure, and passing a cooling fluid, such as air, across or through a portion of the component to aid in cooling of the component.

SUMMARY

In some examples, the disclosure describes a method for forming a component for a gas turbine engine. The method includes forming a first portion of the component, wherein the first portion comprises a cast metal or metal alloy; forming a second portion of the component, wherein the second portion comprises a presintered preform defining at least one support structure; positioning the second portion on the first portion to define an assembly, wherein the first portion and the second portion define at least one cooling channel therebetween; and heating the assembly to join the first portion and the second portion and form the component.

In some examples, the disclosure describes a component of a gas turbine engine. The component includes a first portion of the component, wherein the first portion comprises a cast metal or alloy; and a second portion of the component, wherein the second portion comprises a pres-intered perform defining at least one support structure, wherein the at least one support structure is joined to the first portion to define at least one cooling channel between the first portion and the second portion.

In some examples, the disclosure a radial turbine blade that includes an integrally formed cast metal or alloy defining a hub and a first portion of a plurality of airfoils extending from the hub; and a plurality of second portions of the plurality of airfoils, each comprising a presintered preform defining a plurality of support structures, wherein the plurality of support structures are joined to the first portion to define at least one cooling channel between the first portion and the second portion.

The details of one or more examples are set forth in the accompanying drawings and the description below. Other features, objects, and advantages will be apparent from the description and drawings, and from the claims.

DETAILED DESCRIPTION

The disclosure describes techniques for forming components, such as radial turbine rotors including a plurality of blades, that include using a pre-sintered preform defining at least a portion of the component, such as a portion of an airfoil of a radial turbine blade that includes cooling channels. Hot section components, such as components of a gas turbine engine may be operated in high temperature environments. In some examples, the temperature of such environments may approach or exceed the operational parameters for the respective components. For example, operating temperatures in a turbine section of a gas turbine engine may exceed melting or softening points of the materials used to form such components. In some examples, to reduce or substantially eliminate the risk of melting the engine components, the component may include cooling channels and, optionally, cooling apertures within the dual-walled structure. Such cooling systems may function by flowing cold air (e.g., cooler relative to the high temperature environment), through the cooling channels. These channels may exhaust some or all of the cooling air through cooling apertures in the surfaces of the outer wall of the component. In some examples, the exhausted cooling air may protect the component in high temperature environments by, for example, reducing the relative temperature of the component, creating a film of cooling air passing over the surface of the component exposed to the high temperature environment, reducing the temperature of the gas within the high temperature environment, or a combination of two or more of these effects.

Forming cooling channels and cooling apertures in some components by machining or molding may be difficult due to, for example, a complex geometry of the component, a fragility of the component or a mold used to form the component (e.g., an investment casting mold), or the like. To overcome these difficulties, the examples and techniques described herein include components that include a substrate defining a first portion of a component and a pre-sintered preform defining at least a second portion of the component. The substrate may be cast or otherwise formed by traditional manufacturing techniques. The pre-sintered preform may be formed by additive and/or substrative manufacturing techniques to define complex geometries, such as cooling channels and apertures. The substrate and pre-sintered preform may be bonded to define the final component. Compared to other techniques, the described technique may be more efficient in terms of manufacturing time or cost, or material waste.

Figure 1A:
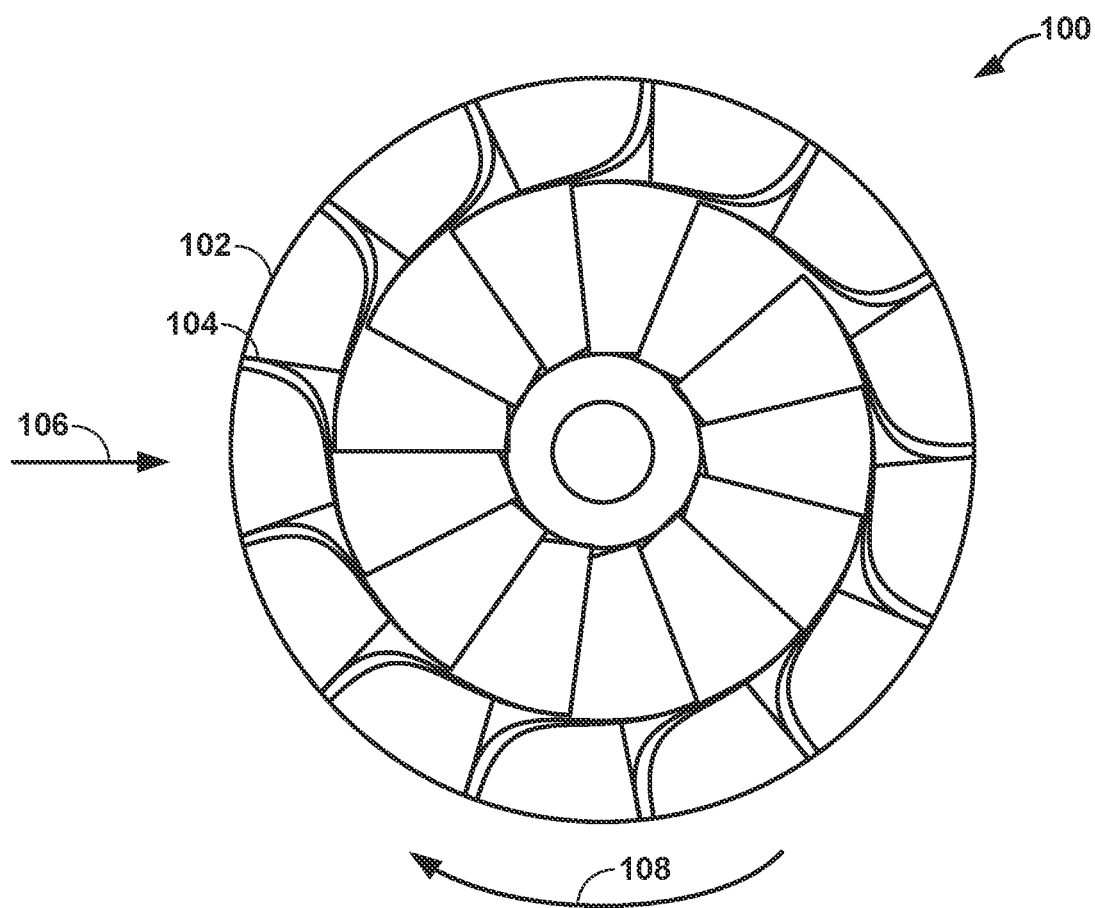
FIGS. 1A and 1B are conceptual diagrams illustrating a top view and side view of an example radial turbine rotor including a plurality of blades.
Figure 1B:
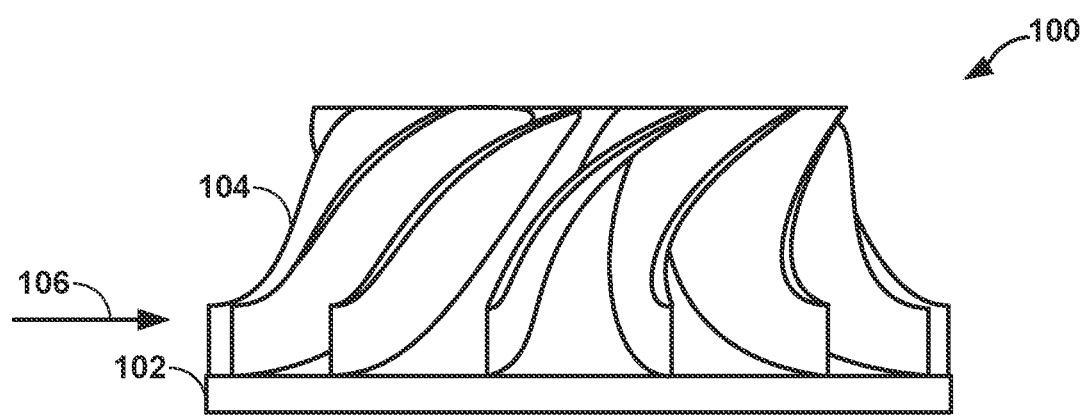

FIGS. 1A and 1B are conceptual diagrams illustrating a top view and side view of an example radial turbine blade 100. Radial turbine blade 100 may include a hub 102 and a plurality of blades (e.g., blades 104). Although illustrated as including thirteen blades 104, in other examples, radial turbine blade 102 may include few blades or additional blades. Hub 102 and blades 104 may be shaped to receive an inflow of a fluid as illustrated by arrow 106, e.g., hot combustion gases, to drive rotation of radial turbine 100 as indicated by arrow 108.

Radial turbine blade 100 may include any suitable material or combination of materials. In some examples, at least a portion of radial turbine blade 100 (e.g., hub 102 and at least a portion of blades 104) may include a metal alloy, such as a superalloy. A superalloy may include, for example, nickel-based superalloy, cobalt-based superalloy, iron-based superalloy, or the like. An example nickel-based superalloy may include, but is not limited to, MAR-M246 or MAR-M247 available from Martin-Marietta Corp., Bethesda, Md., or CMSX-3, CMSX-4, CMSX-10, or CM-186 available from Cannon-Muskegon Corp., Muskegon, Mich. An example cobalt-based superalloy may include, but is not limited to, MAR-M509 available from Martin-Marietta Corp., Bethesda, Md. Representative compositions of CMSX-3 and CMSX-4 are shown below in Table 1.

TABLE 1

|    | CMSX-3 (wt. %) | CMSX-4 (wt. %) |
|----|----------------|----------------|
| Cr | 8              | 6.5            |
| Al | 5.6            | 5.6            |
| Ti | 1              | 1              |
| Co | 5              | 10             |
| W  | 8              | 6              |
| Mo | 0.6            | 0.6            |
| Ta | 6              | 6              |
| Hf | 0.1            | 0.1            |
| Re | —              | 3              |
| Ni | Balance        | Balance        |

In some examples, the material or combination of materials of at least a portion of radial turbine blade 100 may include other metal alloys or braze alloys. For example, as discussed in further detail below, at least a portion of blades 104 may include a pre-sintered perform material.

Radial turbine blade 100 may include any suitable size. For example, a diameter of radial turbine blade 100 may be within a range from about 1 inch (2.54 centimeters (cm) to about 24 inches (60.96 cm), such as about 6 inches (12.24 cm) to about 18 inches (45.72 cm), or about 12 inches (30.48 cm). A height of radial turbine blade 100 may be within a range from about 0.42 inch (1.06 cm) to about 10 inches (25.4 cm), such as about 5 inches (12.7 cm).

In some examples, hub 102 and at least a first portion of blades 104 include one integral component. For example, hub 102 and at least a first portion of blades 104 may be formed at the same time by casting, investment casting, substrative manufacturing, machining, or other metal-forming techniques. When formed as an integral component, hub 102 and blades 104 may be more robust compared to a radial turbine blade having separately formed and subsequently joined hub and blades. For example, a transition from hub 102 to integrally formed blades 104 may carry a greater load relative to a welded or brazed joint at separately formed hub and blades.

In some examples, a second portion of blades 104 may be separately formed and subsequently joined to the first portion of blades 104. For example, the second portion of blades 104 may include a pre-sintered preform that is brazed to the first portion of blades 104. The pre-sintered preform may be formed by any suitable technique, such as subtractive manufacturing or additive manufacturing, e.g., three-dimensional (3D) printing, fuse filament deposition, or the like. Separately forming the second portion of blades 104 may allow formation of internal features, such as cooling channels, cooling apertures, or other structures that may be difficult to form by casting or substrative manufacturing.

Figure 2:
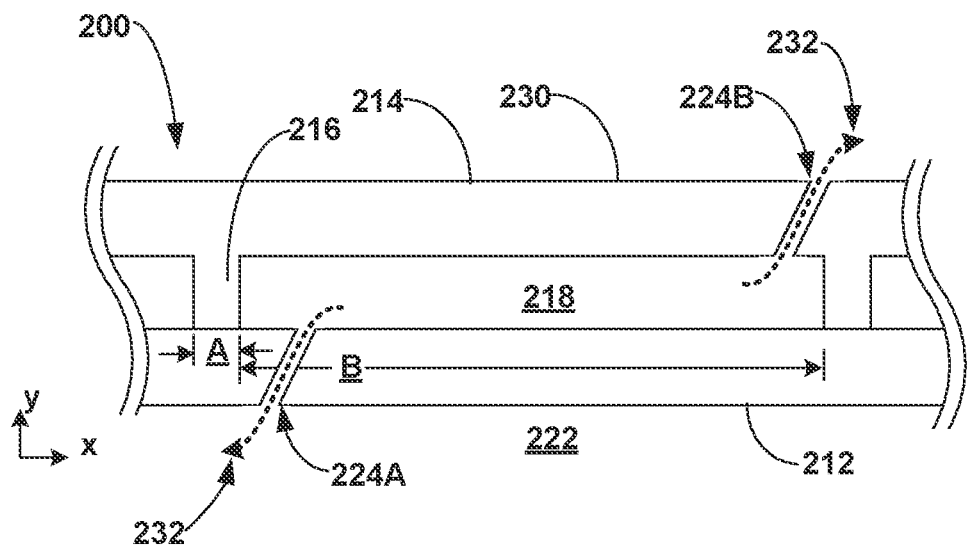
FIG. 2 is a cross sectional view of an example component including a pre-sintered preform defining cooling channels.

FIG. 2 is a cross sectional view of an example component 200 including a pre-sintered preform defining cooling channels. Component 200 includes a first portion 212 and a second portion 214, and a plurality of optional support structures 216 that separate first portion 212 from second portion 214. Component 200 may include one of blades 104 (FIG. 1) having a first portion that is formed by casting or other metal-forming technique and a second portion that includes a separately formed pre-sintered perform joined to the first portion. Although described as a turbine blade, in other examples, component 200 may include other components of a gas turbine engine, such as a flame tube, a combustion ring, a combustor liner, an inner or an outer casing, a guide vane, a nozzle guide vane, a turbine disc, a turbine vane, or another component of a gas turbine engine.

First portion 212, second portion 214, and optional support structures 216 may define one or more cooling channels 218. In some examples, first portion 212 includes a plurality of cooling apertures 224A extending through the thickness of first portion 212. Additionally, or alternatively, second portion 214 may include a plurality of cooling apertures 224B extending through the thickness of second portion 214. During operation of component 200, cooling air 232 from a cooling system may pass through cooling channels 218 and out cooling apertures 224A and 224B (collectively, apertures 224).

During operation, cooling air 232 may assist in maintaining the temperature of component 200 at a level lower than that of heated gas environment 222. For example, the temperature of cooling air 232 may be less than that of hot gas environment 222. Cooling air 232 may flow through cooling channel 218 and impinge on the internal surface of first portion 212 and second portion 214, resulting in heat transfer from first portion 212 and second portion 214 to cooling air 232.

In examples in which component 200 includes cooling apertures 224, cooling air 232 may exit cooling apertures 224 and enter heated gas environment 222, creating a thermally insulating film of relatively cool gas (e.g., relative to a temperature of heated gas environment 222) along surface 230 of component 200 that allows surface 230 of component 200 to remain at a temperature less than that of the bulk temperature of heated gas environment 222. In some examples, cooling air 232 may also at least partially mix with the gas of heated gas environment 222, thereby reducing the relative temperature of heated gas environment 222.

In some examples, cooling air 232 may act as a cooling reservoir that absorbs heat from portions of component 200 as the air passes through one or more of cooling channels 218, apertures 224, or along one or more of the surfaces of component 200, thereby dissipating the heat of component 200 and allowing the relative temperature of component 200 to be maintained at a temperature less than that of heated gas environment 222. In some examples, maintaining the temperature of component 200 within a range less than that of heated gas environment 222 may increase the engine efficiency.

In some examples, cooling air 232 may be supplied to component 200 (e.g., via a cooling air plenum) at a pressure greater than the gas path pressure within heated gas environment 222. The pressure differential between the cooling air plenum and heated gas environment 222 may force cooling air 232 through one or more of the flow paths established by cooling channels 218 and apertures 224.

To define cooling channels 218, plurality of support structures 216 may take on any useful configuration, size, shape, or pattern. In some examples, the height of plurality of support structures 216 may be between about 0.2 mm and about 2 mm to define the height of cooling channels 218. In some examples, plurality of support structures 216 may include a plurality of columns, spires, pedestals, or the like which are used to separate first portion 212 from second portion 214 and create a network of cooling channels 218 therebetween. In some examples, plurality of support structures 216 also may include one or more dams that act as zone dividers between adjacent cooling channels 218, thereby separating cooling channels 218 from one another between first portion 212 from second portion 214. The introduction of dams within component 200 may assist with maintaining a more uniform temperature across surface 230. In some examples, the pattern of cooling channels 218 may resemble a grid, wave, serpentine, swirl, or the like. Example patterns and arrangements of cooling channels are disclosed and described in U.S. Pat. No. 6,213,714 issued Apr. 10, 2001, entitled "COOLED AIRFOIL," which is incorporated herein by reference. In some examples, one or both of first portion 212 and second portion 214 may be formed to define a layer thickness (e.g., in the y-axis direction) of about 0.014 inches to about 0.300 inches (e.g., about 0.36 mm to about 7.62 mm).

Plurality of apertures 224 may be formed using any suitable technique including, for example, mechanical drilling, laser ablation (e.g., picosecond or femtosecond pulsed lasers), electro-chemical machining, or the like. In some examples, apertures 224 may be introduced at an angle to surface 230 (e.g., an offset angle compared to the normal of a respective surface). In some examples, apertures 224 may define an angle of about 10 degrees to about 75 degrees (i.e., with 90 degrees representing the perpendicular/normal to a respective surface). In some examples, one or more of cooling apertures 224 may include a Coanda ramp path from surface 230. A Coanda ramp shaped aperture may assist in the distribution or film characteristics of the cooling air as it exits the respective cooling apertures 224. In some examples, the diameter of apertures 224 may be less than about 0.01 inches to about 0.12 inches in diameter (e.g., about 0.25 millimeters (mm) to about 3 mm).

In some examples, component 200 may be formed using a multistep process. In a first part of the process, first portion 212 may be formed by, for example, a casting process. In a second part of the process, second portion 214 and support structures 216 may be integrally formed as a pre-sintered preform (PSP) by an additive manufacturing process or a subtractive manufacturing process. Subsequently, first portion 212 and second portion 214 (including support structures 216) may be positioned to define an assembly, then joined together, e.g., by heat treatment, to define component 200. Although described as forming first portion 212 by casting and second portion 214 and support structures 216 as a PSP, in other examples, first portion 212 may include a PSP and second portion 214 with support structures 216 may be cast, or both first portion 212 and second portion 214 with support structures 216 may include separately formed PSPs.

In examples in which one or more portions of second portion 214 and/or support structures 216 include a PSP material, the PSP material may be fully sintered through subsequent heat processing bond the parts of the assembly together and produce component 200. The PSP material may offer better workability and ductility compared to an otherwise fully sintered materials, such as those formed using the casting techniques described above. The PSP material may define a complex three-dimensional shape configured to retain its shape independent of molds or other support materials.

Additionally, or alternatively, forming portions of component 200 using a PSP material combined with the subsequent assembly techniques described herein may offer reduced operating costs and waste compared to other techniques. For example, the fabrication of the PSP materials into one or more of the desired assemblies (e.g., second portion 214 and support segments 216) may reduce cost of manufacture due to lower defect levels in the fabrication process, facilitate more complex geometry, or the like compared to fabrication using fully sintered materials or casting other material. In some examples, one or more of first portion 212 or second portion 214 may be formed or machined to a nominal size (e.g., machined to a set standard of specifications) and the respective parts may be bonded together through completion of the sintering process of the PSP material, thereby allowing the parts to be used interchangeably rather than needing to be machined to part specific specifications (e.g., serial number pairing of parts).

The PSP materials described herein may include a mixture of high-melt (e.g., high melting point) metal alloy particles, such as particulates of a superalloy metal, combined with particles of a low-melt (e.g., low melting point) braze material that have been partially sintered together to form the PSP material. As used herein, the low-melt braze material have a comparatively lower melting point than the high-melt metal alloy. The low-melt braze material may act as an interim binder holding the multiple phase regions of the high-melt metal alloy together to help give the PSP shape and structural stability. The mixture of the high-melt metal alloy particles and low-melt braze material may be characterized as a homogeneous mixture in that the particles or phase regions of the high-melt and low-melt materials are evenly distributed throughout the PSP material to provide a substantially uniform composition.

During subsequent heat processing at elevated temperatures, the low-melt braze material, having a comparatively lower melting point than the high-melt metal alloy, may soften and/or melt allowing the low-melt braze material to diffuse into both the phase regions of the high-melt metal alloy and the surrounding components (e.g., first portion 212) to sinter the PSP material into a resulting superalloy metal and bond first portion 212, plurality of support structures 216 and second portion 214 together, thereby forming component 200.

In some examples, the PSP materials described herein may include distinct phase regions (e.g., particulates, particles, grains or the like) of a high-melt metal alloy (e.g., superalloy metal) and distinct phase regions of a low-melt braze material. In some examples, the high-melt metal alloy may include any suitable metal alloy including, but not limited to, nickel-based alloy, cobalt-based alloy, iron-based alloy, or the like. In some examples, the high-melt metal alloy of the PSP material may be a superalloy metal (e.g., nickel-, cobalt-, or iron-based superalloy). Any useful superalloy may be utilized including, for example, nickel-based superalloys such as those available from Martin-Marietta Corp., Bethesda, Md., under the trade designation MAR-M246, MAR-M247 or nickel-based superalloys available from Cannon-Muskegon Corp., Muskegon, Mich., under the trade designations CMSX-3, CMSX-4, CMSX-10, and CM-186; cobalt-based superalloys such as those available from Martin-Marietta Corp., Bethesda, Md., under the trade designation MAR-M509; iron-based superalloys; and the like, as discussed above.

In some examples, the high-melt metal alloy of the PSP material may include particles having a composition of about 50 wt. % to about 70 wt. % Ni, about 2 wt. % to about 10 wt. % Cr, about 2 wt. % to about 10 wt. % Ta, about 5 wt. % to about 15 wt. % Co, about 2 wt. % to about 10 wt. % Al, about 2 wt. % to about 10 wt. % W, about 2 wt. % to about 4 wt. % Re, up to about 3 wt. % Mo, and up to about 3 wt. % Hf. In some examples, the composition of the high-melt metal alloy also may include up to about 1 wt. % each of at least one of Ti, Nb, C, B, Si, or Zr. In some examples, the composition of the high-melt metal alloy may include about 55 wt. % to about 60 wt. % Ni, about 7 wt. % Cr, about 6 wt. % Ta, about 12 wt. % Co, about 6 wt. % Al, about 3 wt. % Re, about 1.5 wt. % Hf, and about 5 wt. % W.

In contrast to the low-melt braze material, the high-melt metal alloy includes an alloy, or a mixture of alloys, that remains substantially unmelted at the braze temperatures used to complete the sintering process of the PSP material. The composition the high-melt metal alloy within the PSP has a melting temperature above the braze temperature (hence the name "high-melt"). The low-melt braze material may have a composition that includes an alloy or a mixture of alloys that melt at a temperature below about 1232° C. (about 2250° F.), with the alloy or mixture of alloys being selected so that the low-melt braze material as a whole substantially melts at a temperature between about 1093° C. (about 2000° F.) and about 1260° C. (about 2300° F.). In contrast, the high-melt metal alloy may have a composition that includes a single high-melt alloy or a mixture of alloys that melt at a temperature of greater than about 1315° C. (about 2400° F.).

In some examples, the low-melt braze material may include one or more nickel-based or cobalt-based alloys. In some examples, the low-melt braze material may include particulates that include between about 50 wt. % and about 70 wt. % Ni, between about 8 wt. % and about 20 wt. % Cr, between about 8 wt. % and about 15 wt. % Ta, between about 4 wt. % and about 10 wt. % Co, between about 2 wt. % and about 7 wt. % Al, up to about 2.25 wt. % B, and up to about 2.25 wt. % Si, and has a compositional melting range of between about 1093° C. (about 2000° F.) and about 1260° C. (about 2300° F.). In some examples, the low-melt braze material may also include up to about 1 wt. % each of at least one of Ti, W, Mo, Re, Nb, Hf, Pd, Pt, Ir, Ru, C, Si, P, Fe, Ce, La, Y, or Zr.

In some examples, the low-melt braze material comprises a mixture of two or more low-melt alloys. For example, a low-melt braze material may include particles of (a) about 35% of a first low-melt material including about 74 wt. % Ni, about 6 wt. % Cr, about 6 wt. % Al, about 12 wt. % Co, and about 2 wt. % B, with a liquidus temperature of about 1121° C. (about 2050° F.); (b) about 45% of a second low-melt material including about 42 wt. % Ni, about 31 wt. % Cr, about 26 wt. % Ta, and about 1 wt. % B, with a liquidus temperature of about 1232° C. (about 2250° F.); and (c) about 20 wt. % of a third low-melt material including about 64 wt. % Ni, about 6 wt. % Al, about 8 wt. % Co, about 4 wt. % W, about 4 wt. % Ta, about 3 wt. % Si, about 1 wt. % Re, about 1 wt. % Nb, and about 1 wt. % B, with a liquidus temperature of about 1093° C. (about 2000° F.).

The low-melt braze material and the high-melt metal alloy may each be combined initially in particulate form. For example, the PSP material may be formed by homogenously mixing (e.g., mechanically mixing) particles of the high-melt metal alloy and low-melt braze material with an optional binder in a selected composition and depositing the mixture into a mold of a desired shape (e.g., a mold of second portion 214). Next, the mixture may be partially sintered via heating the mixture at a temperature above the softening or melting point of the low-melt braze material and, preferably, below the melting temperature of the high-melt metal alloy. The sintering temperature and the duration of the initial sintering may depend at least in part on the composition of the initial mixture of high-melt and low-melt materials.

The PSP material defining a selected shape, such as second portion 214 and support structures 216, may be formed using any suitable technique, such as additive manufacturing techniques, subtractive manufacturing techniques, or both. Example additive manufacturing techniques may include, but are not limited to, 3D printing or fuse filament deposition, such as described in U.S. patent application Ser. No. 17/095,201, filed on Nov. 11, 2020, entitled "FUSED FILAMENT FABRICATION OF BRAZE ALLOYS," the entire contents of which is incorporated herein by reference. Example subtractive manufacturing techniques may include, but are not limited to, laser cutting or etching, chemical or electrochemical etching, or machining. For example, a resultant PSP material formed by additive manufacturing may be cut or machined into the selected shape. In some examples, the PSP material may include a complex geometry, e.g., multiple planes or surfaces, simple or complex curves, overhangs, undercuts, protrusions, or the like depending upon the desired geometry of component 200.

In some examples, the initial mixture of the low-melt braze material and the high-melt metal alloy may have specific powder mesh sizes, and may be produced by induction melting the low-melt braze material or the high-melt metal alloy, respectively, in vacuum or an argon atmosphere, followed by argon gas atomization. Each individual powder component used in PSP material may be analyzed to confirm the particle size and chemical compositions.

The low-melt braze material and high-melt metal alloy of the PSP may be combined in any selected ratio. In some examples, the initial mixture used to form the PSP material may include a powder mixture including or consisting essentially of about 20 wt. % to about 80 wt. % of the low-melt braze material and a balance of the high-melt metal alloy (a ratio of between about 1:4 and about 4:1 low-melt:high-melt material ratio). In some cases, the low-melt braze material may be a mixture of more than one braze alloy particulates. In some examples, the ratio of the low-melt braze material to the high-melt metal alloy may be between about 1:3 and about 3:1, such as a ratio between about 1:2 and about 2:1 low-melt:high-melt material, or a ratio between about 1:1 and about 1:1.5 low-melt:high-melt material. For example, the PSP material may include about 40 wt. % to about 50 wt. % low-melt braze material and about 50 wt. % to about 60 wt. % high-melt metal alloy, such as about 45 wt. % low-melt braze material and about 55 wt. % high-melt metal alloy.

Hence, in some examples, the PSP material may include about 50 wt. % to about 90 wt. % Ni, up to about 15 wt. % Cr, up to about 10 wt. % Ta, up to about 10 wt. % Co, up to about 7 wt. % Al, up to about 4 wt. % W, up to about 2 wt.

% Re, up to about 1 wt. % Mo, up to about 1 wt. % Hf, and, optionally, up to about 0.5 wt. % Nb, up to about 3 wt. % Si, and up to about 3 wt. % B. In some examples, the PSP material may include between about 50 wt. % and about 70 wt. % Ni, between about 10 wt. % and about 15 wt. % Cr, between about 8 wt. % and about 10 wt. % Ta, between about 8 wt. % and about 10 wt. % Co, between about 4 wt. % and about 7 wt. % Al, between about 2 wt. % and about 4 wt. % W, between about 1 wt. % and about 2 wt. % Re, about 1 wt. % Mo, about 1 wt. % Hf, and, optionally, up to about 1% each at least one of Ti, Nb, Pd, Pt, Ir, Ru, C, B, Si, P, Mn, Fe, Ce, La, Y, or Zr. In some examples, the PSP material may include about 50 wt. % to about 70 wt. % Ni, about 10 wt. % to about 15 wt. % Cr, about 8 wt. % to about 10 wt. % Ta, about 8 wt. % to about 10 wt. % Co, about 4 wt. % to about 7 wt. % Al, about 2 wt. % to about 4 wt. % W, about 1 wt. % to about 2 wt. % Re, about 0.5 wt. % to about 1 wt. % Mo, about 0.5 wt. % to about 1 wt. % Hf, about 0.1 wt. % to about 0.5 wt. % Nb, about 0.05 wt. % to about 3 wt. % Si, and about 0.5 wt. % to about 2 wt. % B. In some examples, the PSP material may include about 58 wt. % Ni, about 11 wt. % Cr, about 9 wt. % Ta, about 9 wt. % Co, about 5 wt. % Al, about 3 wt. % W, about 1 wt. % Mo, about 1 wt. % Re, and about 1 wt. % Hf; or may include about 10.2 wt. % to about 11.3 wt. % Cr, about 4.8 wt. % to about 5.1 wt. % Al, about 9.1 wt. % to about 9.8 wt. % Co, about 2.8 wt. % to about 3.3 wt. % W, about 0.7 wt. % to about 0.9 wt. % Mo, about 8.2 wt. % to about 8.8 wt. % Ta, about 0.6 wt. % to about 0.8 wt. % B, about 0.3 wt. % Si, about 1.5 wt. % to about 1.8 wt. % Re, about 0.8 wt. % to about 0.9 wt. % Hf, about 0.1 wt. % to about 0.2 wt. % Nb, and a balance Ni.

In selecting the proportions of components used in the PSP material, higher weight percentages of the high-melt metal alloy may provide better mechanical properties in view of their reduced levels of boron, silicon, or both. Conversely, higher percentages of the low-melt braze material may provide improved flow (e.g., of the low-melt braze material) at the joint region. A proper balance between mechanical properties and material flow should be selected.

In some examples, a PSP material that includes higher Al content may possess improved high-temperature oxidation resistance properties compared to a PSP material with lower Al content. Further, increasing Ta content in a PSP material may improve mechanical properties at or near the resultant joint region compared to lower Ta content. In particular, Ta may strengthen the gamma NiAl and gamma prime Ni$_3$Al phases by increasing lattice mismatches.

Figure 3:
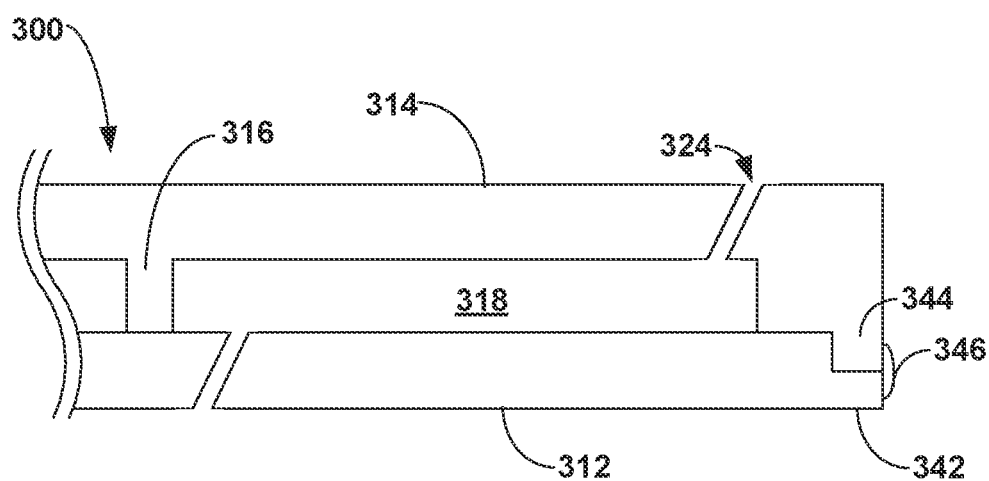
FIG. 3 is a conceptual diagram illustrating an example component that includes corresponding alignment tabs.

In some examples, a first portion, a second portion, or both may include features to facilitate alignment of the first portion and the second portion, support the first portion and the second portion during heat treatment, or both. FIG. 3 is a conceptual diagram illustrating an example component 300 that includes corresponding alignment tabs 340 and 344. Component 300 may be the same as or substantially similar to component 200 discussed above in reference to FIG. 2. For example, component 300 includes a first portion 312, a second portion 314, and support structures 316, which define cooling channels 318, as well as optional cooling apertures 324.

As illustrated in FIG. 3, first portion 312 includes first alignment tab 342 and second portion 314 includes second alignment tab 344. Alignment tabs 342 and 344 included corresponding shapes such that when first portion 312 and second portion 314 are positioned relative to one another in a selected orientation, alignment tab 344 nests with alignment tab 342. Generally, alignment tabs 342 and 344 may include any suitable corresponding shapes. For example, as illustrated in FIG. 3, alignment tabs 342 and 344 may include rectilinear shapes. In other examples, alignment tabs may include cylindrical pillars and coves, hemispherical protrusions and depressions, or any other suitable corresponding shapes.

Although alignment tabs 342 and 344 are illustrated as flush with an final dimension of component 300, in other examples, alignment tabs may protrude from a surface defining a final dimension of component 300. For example, alignment tabs protruding from a surface defining a final dimension of component 300 may be removed by machining or the like after heat treating component 300 to join first portion 312 and second portion 314.

Although FIG. 3 illustrates one of corresponding alignment tabs 342 and 344, in other examples, component 300 may include a plurality of alignment tabs. For example, component 300 may include two or more alignment tabs, such as ten or more alignment tabs or one hundred or more alignment tabs. Additionally, or alternatively, support structures 216 may include alignment tabs or a portion of support structures 216 may define alignment tabs corresponding to alignment tabs (or features configured to receive alignment tabs therein) defined by a surface of first portion 312. The number and relative position of a plurality of alignment tabs may be selected to provide a selected alignment of first portion 312 relative to second portion 314 in two dimensions or in three dimensions.

In some examples, after alignment of first portion 312 and second portion 314 using alignment tabs 342 and 344, alignment tabs 342 and 344 may be tack welded (e.g., weld 346) or otherwise bonded together to secure first portion 312 to second portion 314 for subsequent processing, e.g., heat treatment. In examples in which alignment tabs 342 and 344 are bonded together, alignment tabs 342 and 344 may extend from a plane defining a final selected dimension of component 300. This may facilitate machining weld 346 from component 300 after heat treatment.

Figure 4:
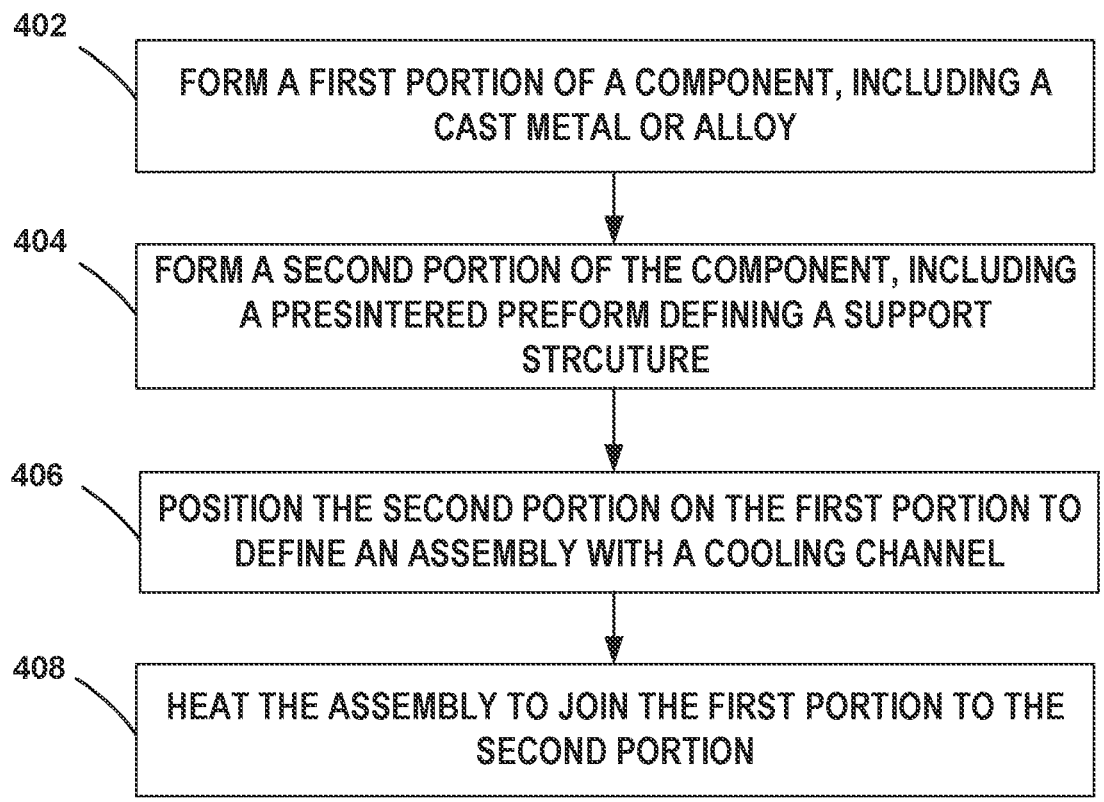
FIG. 4 is a flow diagram illustrating an example technique for forming a component including a pre-sintered preform defining cooling channels.

The components described herein may be formed using any suitable technique. FIG. 4 is a flow diagram illustrating an example technique for forming a component including a pre-sintered preform defining cooling channels. The technique illustrated in FIG. 4 is described with reference to radial turbine blade 100, component 200, and component 300 described above in reference to FIGS. 1-3. However, the technique illustrated in FIG. 4 may be used to form different components. Additionally, radial turbine blade 100, component 200, and/or component 300 may be formed using a different or modified techniques.

The technique illustrated in FIG. 4 includes forming first portion 212 of component 200 (402). In examples in which component 200 includes a radial turbine blade (e.g., radial turbine claims 100), first portion 212 may include hub 102 and a first portion of each blade of a plurality of blades 104.

In some examples, forming first portion 212 may include casting, such as investment casting, a metal or a metal alloy. For example, first portion 212 may be formed using a hot-melt casting technique in which the underlying metal or alloy material (e.g., a superalloy metal such as nickel-, cobalt-, or iron-based superalloys) is heated to a molten state and cast into a mold defining the desired shape for first portion 212. In other examples, first portion 212 may be formed from a PSP material using a mold casting technique or additive manufacturing technique, such as 3D printing or fuse filament deposition.

In some examples, forming first portion 212 may include additional processing steps, such as adding material to form first portion 212, removing material to form first portion 212, or cleaning or otherwise preparing first portion 212 for subsequent processing steps. In some examples, after being formed, one or more apertures 224 may be introduced (e.g., by laser drilling, machining, or the like) along first portion 212 to provide passage of cooling air 232. In some examples, after being formed, one or more alignment tabs 342 may be introduced (e.g., by laser drilling, machining, or the like) into first portion 212.

The technique illustrated in FIG. 4 also includes forming second portion 214 of component 200 (404). As described above, second portion 214 may include a presintered preform defining at least one support structure 216. For example, forming second portion 214 may include mixing particles of a high-melt metal alloy (e.g., a superalloy metal) with particles of a low-melt braze material, and any optional additive materials or temporary binders. In some examples, the materials may be combined as an unsintered clay composite that is molded (e.g., using a mandrel or mold) into a desired shape. In other examples, the materials may be deposited onto a build platform by a 3D printer or using fuse filament deposition to define an unsintered component. The unsintered component may be heated to partially sinter some of the high-melt metal alloy and/or low-melt braze material to form a PSP material in the shape of second portion 214.

In some examples, forming second portion 212 may include additional processing steps, such as adding material to the PSP to form second portion 214, removing material from the PSP to form second portion 214, or cleaning or otherwise preparing the PSP for subsequent processing steps. In some examples, after forming the PSP, one or more apertures 224 may be introduced (e.g., by laser drilling, machining, or the like) along second portion 214 to provide passage of cooling air 232. In some examples, after forming the PSP, one or more alignment tabs 344 may be introduced (e.g., by laser drilling, machining, or the like) into second portion 214.

In some examples, after forming the PSP, material may be removed (e.g., by laser drilling, machining, or the like) to define support structures 216. Alternatively, support structures 216 may be formed independent of second portion 214 and first portion 212 and subsequently joined to second portion 214 and/or first portion 212.

After forming first portion 212 and second portion 214, the technique includes positioning second portion 214 on first portion 212 to define an assembly (406). Once positioned, first portion 212 and second portion 214 may define at least one cooling channel 218 therebetween. The various bonding surfaces between first portion 212, second portion 214, and support structures 216 may be positioned either in direct contact with the respective bonding surfaces of adjacent components or may be positioned with a temporary adhesive disposed therebetween. The temporary adhesive may be fugitive material and function as a processing aid to temporarily hold one more of first portion 212, second portion 214, and support structures 216 in relative position to another respective component. During subsequent processing to bond the various parts together, the temporary adhesive may thermally decompose such that the adhesive does not form part or serve a role in the final component being created. In some examples, at least one of the bonding surfaces of support structures 216 may include the temporary adhesive.

After positioning first portion 212 and second portion 214, the technique includes heating the assembly to join first portion 212 and second portion 214 and form component 200 (408). During the heating process, the PSP material of second portion 214 may be heated to a temperature above the softening or melting point of the low-melt braze material and below the melting point of the high-melt braze material to complete the brazing process. In some examples, during the heating process, the entire assembly may be placed into a furnace or autoclave and collectively heated to a temperature above the softening point of the low-melt braze material and below the softening point of the high-melt metal alloy to complete the sintering process. Example techniques and apparatuses used for performing bonding of components which may be used or adapted for use in bonding are described in U.S. patent application Ser. No. 15/184,235, filed Jun. 16, 2016, entitled "AUTOMATED COATING APPLICATION," and U.S. patent application Ser. No. 14/727,593, filed Jun. 1, 2015, entitled "FIXTURE FOR HIGH TEMPERATURE JOINING," each of which is incorporated herein by reference.

Various examples have been described. These and other examples are within the scope of the following claims.

What is claimed is:

1. A method for forming a component for a gas turbine engine, the method comprising:
    forming a first portion of the component, wherein the first portion comprises a cast metal or metal alloy;
    forming a second portion of the component, wherein the second portion comprises a presintered preform defining at least one support structure, wherein the presintered preform includes a partially sintered mixture of high-melt metal alloy particles and low-melt braze material particles;
    positioning the second portion on the first portion to define an assembly, wherein the first portion and the second portion define at least one cooling channel therebetween; and
    heating the assembly to join the first portion and the second portion and form the component,
    wherein the component comprises a radial turbine blade, wherein the first portion comprises a hub and a first part of a plurality of airfoils of the radial turbine blade, and wherein the second portion comprises a plurality of second parts of the plurality of airfoils.

2. The method of claim 1, wherein forming the first portion of the component comprises forming, by investment casting, the hub and the first part of a plurality of airfoils of the radial turbine blade.

3. The method of claim 1, wherein forming the second portion of the component comprises forming, by three-dimensional printing, the presintered preform.

4. The method of claim 1, wherein forming the second portion of the component comprises forming, by fused filament deposition, the presintered preform.

5. The method of claim 1, wherein forming the second portion of the component comprises forming the presintered preform to define at least one cooling aperture extending through the second portion and fluidly coupled to the at least one cooling channel.

6. The method of claim 1, wherein the presintered preform further defines at least one alignment tab, wherein positioning the second portion on the first portion comprises aligning the at least one alignment tab on the second portion with a corresponding alignment feature on the first portion to define the assembly.

7. The method of claim 6, wherein the method further comprises, before heating, bonding the at least one alignment tab on the second portion to the corresponding alignment feature on the first portion.

8. The method of claim 6, wherein the method further comprises removing the at least one alignment tab to define a final shape of the component.

9. The method of claim 1, wherein heating the assembly to join the first portion and the second portion and form the component comprises heating the second component to achieve a temperature of the presintered preform above a melting point of the low-melt braze material particles and below a melting point of the high-melt metal alloy particles to sinter the presintered preform.

10. The method of claim 1, wherein the at least one cooling channel includes an internal cooling channel formed between a respective second part of the plurality of airfoils and a respective first part of the plurality of airfoils.

11. The method of claim 10, wherein the respective first part defines a first cooling aperture extending through the respective first part, wherein the respective second part defines a second cooling aperture extending through the respective second part, and wherein the first cooling aperture and the second cooling aperture are fluidically coupled to the internal cooling channel.

12. The method of claim 11, wherein the first cooling aperture and the second cooling aperture are fluidically coupled to the internal cooling channel such that a cooling air from the internal cooling channel passes out of the internal cooling channel through the first cooling aperture and the second cooling aperture to cool a portion of the radial turbine blade.

13. The method of claim 1, wherein the at least one cooling channel includes an internal cooling channel formed between a respective second part of the plurality of airfoils and the hub.

14. The method of claim 1, wherein the presintered preform comprises a homogenous mixture of the high-melt metal alloy and the low-melt braze material.

15. The method of claim 1, wherein the high-melt metal alloy comprises at least one of a nickel-based superalloy, a cobalt-based superalloy, or an iron-based superalloy.

* * * * *